United States Patent
Roodenburg

(10) Patent No.: US 9,857,277 B2
(45) Date of Patent: Jan. 2, 2018

(54) LAND BASED DYNAMIC SEA MOTION SIMULATING TEST DRILLING RIG AND METHOD

(71) Applicant: Itrec B.V., Schiedam (NL)

(72) Inventor: Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 214 days.

(21) Appl. No.: 14/922,828

(22) Filed: Oct. 26, 2015

(65) Prior Publication Data

US 2016/0116376 A1  Apr. 28, 2016

(30) Foreign Application Priority Data

Oct. 24, 2014 (NL) .................................... 2013685
Mar. 5, 2015 (NL) .................................... 2014405

(51) Int. Cl.
*G01M 99/00* (2011.01)
*E21B 7/128* (2006.01)
(Continued)

(52) U.S. Cl.
CPC ........... *G01M 99/007* (2013.01); *E21B 7/128* (2013.01); *E21B 15/006* (2013.01); *E21B 15/02* (2013.01);
(Continued)

(58) Field of Classification Search
None
See application file for complete search history.

(56) References Cited

U.S. PATENT DOCUMENTS 3,677,016 A   7/1972  Garrigus
3,791,628 A * 2/1974  Burns ...................... B66D 1/48
                                                        254/277
(Continued)

FOREIGN PATENT DOCUMENTS

CN    102980732 A  *  3/2013
CN    103743534 A  *  4/2014
(Continued)

OTHER PUBLICATIONS

Vibration test and assessment for an ocean drilling rig derrick, Jun et al., Petroleum Exploration and development, vol. 40, Issue 1, Feb. 2013.*

(Continued)

*Primary Examiner* — Lisa Caputo
*Assistant Examiner* — Tran M Tran
(74) *Attorney, Agent, or Firm* — Birch, Stewart, Kolasch & Birch, LLP

(57) ABSTRACT

A land based dynamic sea motion simulating test drilling rig has a soil bound foundation and a pivot structure secured to said foundation. A motion base is mounted on said pivot structure and pivotable about at least one horizontal pivot axis. A drilling tower is erected on said motion base and is provided with a hoisting device adapted to manipulate a drill string section in a vertical firing line. A drilling tubulars storage vertically stores drilling tubulars and a tubulars racker device moves drilling tubulars between the drilling tubulars storage device and the firing line allowing for assembly and disassembly of a drill string section in the firing line. A motion drive is provided which is adapted to impart cyclic pivoting motion about said at least one horizontal pivot axis to the assembly of the drilling tower, drilling tubulars storage, and tubulars racker device in order (Continued)

to simulate said assembly being subjected to a sea state induced motion.

42 Claims, 10 Drawing Sheets

(51) Int. Cl.
*E21B 15/00* (2006.01)
*E21B 15/02* (2006.01)
*E21B 15/04* (2006.01)
*E21B 19/14* (2006.01)

(52) U.S. Cl.
CPC .............. *E21B 15/04* (2013.01); *E21B 19/14* (2013.01); *E21B 19/143* (2013.01)

(56) References Cited

U.S. PATENT DOCUMENTS

| | | | | |
|---|---|---|---|---|
| 3,930,374 A * | 1/1976 | Hoppe | ................... | E02B 17/00 114/144 B |
| 4,883,388 A * | 11/1989 | Cherbonnier | .......... | B63G 11/00 114/264 |
| 5,209,302 A * | 5/1993 | Robichaux | .............. | E21B 19/09 166/355 |
| 6,321,596 B1 * | 11/2001 | Newman | ................. | E21B 19/22 73/152.45 |
| 6,408,956 B1 * | 6/2002 | Morris | .................. | E21B 19/084 173/44 |
| 6,763,898 B1 | 7/2004 | Roodenburg et al. | | |
| 6,926,260 B1 * | 8/2005 | De Groot | ............... | B66D 3/043 254/277 |
| 8,839,570 B1 * | 9/2014 | Petrello | .................. | E04H 12/344 52/115 |
| 9,557,171 B2 * | 1/2017 | Tian | ........................ | G01C 13/00 |
| 9,631,442 B2 * | 4/2017 | Bansal | .................... | E21B 17/01 |
| 2011/0174545 A1 * | 7/2011 | Hartke | ..................... | E21B 7/02 175/113 |
| 2017/0074056 A1 * | 3/2017 | Roodenburg | ....... | B63B 35/4413 |

FOREIGN PATENT DOCUMENTS

| | | |
|---|---|---|
| WO | WO 00/11305 A1 | 3/2000 |
| WO | WO 01/18350 A1 | 3/2001 |
| WO | WO 2009/048322 A1 | 4/2009 |
| WO | WO 2011/017584 A2 | 2/2011 |

OTHER PUBLICATIONS

CN 102980732 A.*
CN 103743534 A.*
Åsen, "Introduction to IRIS lab tour," IRIS, XP055195939, Jun. 2, 2014, 22 pgs.

* cited by examiner

LAND BASED DYNAMIC SEA MOTION SIMULATING TEST DRILLING RIG AND METHOD

FIELD OF THE INVENTION

The present invention relates to the field of drilling rigs, in particular to the development of offshore drilling rigs of the type that is to be installed on a floating offshore drilling vessel and as such subjected to one or more sea state induced motions, for example to roll motion of the drilling vessel.

BACKGROUND OF THE INVENTION

An example of a drilling rig adapted for installation on a floating offshore drilling vessel is disclosed in U.S. Pat. No. 6,763,898. This known drilling rig comprises:
- a drilling tower embodied as a mast having a foot to be secured to the hull of the vessel, the mast being provided with a hoisting device adapted to manipulate a drill string section in a vertical firing line,
- a drilling tubulars storage adapted for vertical storage of drilling tubulars, e.g. drill pipe stands,
- a tubulars racker device arranged and configured to move drilling tubulars between the drilling tubulars storage and the firing line allowing for assembly and disassembly of a drill string section in the firing line.

When installed on the vessel the drilling rig and all its components are subjected to sea state induced motions, e.g. to roll motion. It is noted that the height of the drilling rig can be very substantial, e.g. more than 50 meters, e.g. in view of handling, including storing, multiple joint tubular stands, e.g. triples or quads or even longer stands, e.g. stands having a length exceeding 100 foot.

In WO2009/048322 it is disclosed to provide the floating drilling vessel with a roll damping system to counter roll motion.

OBJECT OF THE INVENTION

The present invention aims to facilitate and enhance the further development of drilling rigs that are to be installed on floating offshore drilling vessels.

SUMMARY OF THE INVENTION

The present invention achieves this aim by providing a land based dynamic sea motion simulating test drilling rig comprising:
- a soil bound foundation, e.g. a pile foundation comprising multiple piles,
- a pivot structure secured to said foundation, said pivot structure providing at least one horizontal pivot axis,
- a motion base mounted on said pivot structure and pivotable about said at least one horizontal pivot axis relative to the foundation, e.g. for simulating sea state induced roll motion,
- a drilling tower erected on said motion base and having a foot that is secured to said motion base, the drilling tower being provided with a hoisting device adapted to manipulate a drill string section in a vertical firing line,
- a drilling tubulars storage adapted for vertical storage of drilling tubulars, e.g. drill pipe stands, said tubulars storage secured to said motion base,
- a tubulars racker device secured to said motion base, and arranged and configured to move drilling tubulars between the drilling tubulars storage and the firing line allowing for assembly and disassembly of a drill string section in the firing line,
- a motion drive adapted to impart cyclic pivoting motion about said at least one horizontal pivot axis to the assembly of the drilling tower, drilling tubulars storage, and tubulars racker device in order to simulate said assembly being subjected to sea state induced motion.

It is noted that each of the drilling tubulars storage and tubulars racker device may be directly secured to the motion base, but it is also envisaged, as shown in the drawings, that e.g. the racker device is connected to the tower and thereby indirectly to the motion base. Yet, even when connected indirectly, these components are subjected to the pivoting or swaying motion when the motion drive is in operation.

By provision of the land based dynamic sea motion simulating test drilling rig the development of this type of rigs to be installed on a floating offshore vessel can be enhanced as components and/or their interaction and/or accuracy of motion performed can be monitored during a test, e.g. simulating the making up and/or breaking up of a tubulars string in the firing line, whilst under simulated sea motion conditions.

When components of the rig are subjected to a prolonged test, e.g. of multiple hours or multiple days, the long-time behaviour, e.g. in view of wear, of one or more components of the drilling rig can be monitored and design changes proposed or the design accepted.

For example the tubular racker device can be tested under sea motion conditions as to the accuracy of the motion of the tubular racker device when simultaneously subjected to said simulated pivoting motion. For example one can monitor the accuracy of the motions performed by the racker device, e.g. allowing to optimize a computer program governing such motion and/or interaction with or design of one or more sensors involved in controlling motion of the racker device.

It is noted that the tower height may in embodiments be greater than 50 meters.

For example the tower and the hoisting device thereof, the tubulars storage, and the tubulars racker are adapted to handle tubular stands having a length greater than 90 feet, e.g. 120 feet drill pipe stands.

In order to allow for testing of make-up of a significant drill string section, e.g. having a length of about 100 meters, and of the lowering and/or raising thereof in the firing line by means of the hoisting device of the drilling tower it is preferred to provide a deep well sunken into the soil at a location aligned with the firing line. For example a concrete lined well, e.g. of stacked rings or otherwise, or a steel walled well is provided. It is preferred for said well to have a diameter greater than said drilling tubulars, in particular such a diameter that a drilling tubular section extending into said well is able to move within the well as a result of the pivotal motion imparted to the assembly by the motion drive.

For example the diameter of the well is between 1 and 10 meters, e.g. 3 meters.

For example the well has a depth of at least 30 meters, e.g. of between 30 and 75 meters, e.g. of about 60 meters.

The well may be entirely empty so that the string is freely suspended in the well. One may also envisage, e.g. for simulating underwater conditions or to practice diving operations or operations with remote operated vehicles, that the well is—e.g. in part—filled with a fluid, e.g. with water.

Preferably the well is equipped with a pump device to pump out water if desired.

The well can comprise a bottom, e.g. a steel or reinforced concrete bottom, which bottom is provided with one or more premade drilling holes through which a borehole can be drilled deeper into the soil below the well. Such boreholes can subsequently be filled again to permit repeated drilling tests. The holes permit the simulation of drilling activities, e.g. through a drilling riser, possibly arranged within the well, and/or into the soil, the simulation of the standbuilding and tripping of a drill string, etc. The depth of the drilling holes below the well can be between 100 and 800 m, e.g. 400 m.

The bottom of the well may comprise attachment means, e.g. a hook or eye plate, e.g. having a tensile load capacity of at least 50 tonnes, e.g. to attach one or more cables in order to perform tests on the hoisting device of the drilling tower.

In an embodiment the motion drive is adapted to impart a cyclic pivoting motion having a period that lies in a range between 2 and 30 seconds. In a preferred embodiment the motion drive is a variable drive, e.g. adapted to impart any period over a range between 2 and 30 seconds.

In an embodiment the motion drive is adapted to impart a cyclic pivoting motion having a pivot angle relative to vertical of at least 1°, e.g. of at most +/−10°. For example the motion drive is adapted to impart a variable pivot angle in a range greater than +/−1°, e.g. between +/−1° and +/−5°.

For example it is envisaged that tests are performed with a cyclic pivoting of about +/−2° and a period of between 4 and 12 seconds.

In an embodiment the pivot structure provides a single horizontal pivot axis, preferably intersecting the firing line.

In an embodiment the motion drive comprises a strut having an upper end attached to the drilling tower at an elevated position thereof and having a lower end attached to a drive motor device. In a further variant the drive motor device comprises a motor driven rocker arm pivotally connected to said strut and adapted to perform a cyclic rocking motion about a horizontal rocker arm axis.

The motion drive may be a drive means comprising e.g. the abovementioned motor driven rocker arm, a hydraulic cylinder, a flywheel or a crankshaft. However, such drive means require large amounts of power, for example around 1 Megawatt, in order to impart a cyclic pivot motion to the assembly of drilling tower, drilling tubulars storage and tubulars racker device. The large power consumption of these drive means forms an impediment to the establishment of the test drilling rig.

According to a further development of the present invention, the cyclic motion is imparted to said assembly in a way that consumes much less power by providing a pendulum system comprising:
 a frame secured to a soil bound foundation, e.g. a pile foundation comprising multiple piles,
 a compound pendulum suspended from said frame, the compound pendulum rotatable or swingable relative to the frame about at least one horizontal swing axis,
 a strut having an end, e.g. an upper end, pivotally attached to the drilling tower, e.g. at an elevated position thereof, and having another end, e.g. a lower end, pivotally connected to the compound pendulum by means of a pivot connector providing a pivot point that is offset from said at least one swing axis between the compound pendulum and frame,
 a drive motor,
 wherein the drive motor is adapted to supply energy to impart a cyclic motion to the assembly of compound pendulum, strut, motion base, drilling tower, drilling tubulars storage and tubulars racker device, said cyclic motion having a frequency that is equal to the resonance frequency of the assembly.

Compared to other types of drive means the pendulum system does allow for a much smaller drive motor using less energy.

The cyclic motion of the assembly of compound pendulum, strut, motion base, drilling tower, drilling tubulars storage and tubulars racker device can be driven with a relatively low power consumption, as during cyclic motion at the resonance frequency of said assembly energy is efficiently transferred from kinetic energy to potential energy and vice versa.

In practical embodiments the structure of the pendulum system may be rather large, e.g. for a total mass of the drilling tower, motion base, drilling tubulars storage loaded with drilling tubulars, and racker devices in the range between 1000-1500 metric tonnes the compound pendulum may weigh e.g. in the region of 150-350 metric tonnes. Yet it is envisaged that such a system may be powered by a drive motor having a capacity in the range between 30 and 100 kW, e.g. about 40 kW.

The pivot connector that connects the strut to the compound pendulum is offset from said swing axis between compound pendulum and frame so that a rotation of the compound pendulum about its said at least one horizontal swing axis results in a motion of the strut and, vice versa, a motion of the strut leads to a rotation of the compound pendulum about its said at least one horizontal swing axis.

For example the drive motor imparts a small non-zero pivot angle to said assembly to start the cyclic motion and during subsequent swings supplies additional energy to impart a cyclic motion with a larger maximal non-zero pivot angle of the motion base relative to horizontal. For example, when the required maximal non-zero pivot angle of the motion base relative to horizontal has been reached a lower amount of energy is supplied by the drive motor to maintain said required maximum pivot angle.

The pendulum system can further comprise one or more weight elements that can be added to or removed from the compound pendulum. For example the total weigh variation of the compound pendulum by means of these weight elements can be at least 50 tonnes, e.g. more than 100 tonnes, e.g. about 150 tonnes. In an embodiment the weight elements are metal plate elements, e.g. to be stacked side-by-side, e.g. in two rows. These weight elements act to adjust the resonance frequency and/or acceleration of the assembly of compound pendulum, strut, motion base, drilling tower, drilling tubulars storage and tubulars racker device.

The cyclic motion of the assembly of compound pendulum, strut, motion base, drilling tower, drilling tubulars storage and tubulars racker device imparted in this way has a period, and therefore a frequency, that preferably lies in the range abovementioned for the period of the cyclic pivoting motion.

The resonance frequency and/or acceleration is also dependent on the weight of the assembly of drilling tower, drilling tubulars storage and tubulars racker device.

Said cyclic pivoting motion imparted by the pendulum system has a pivot angle that preferably lies in the range abovementioned for the pivot angle relative to vertical.

The distribution of weight of the assembly of drilling tower, drilling tubulars storage and tubulars racker device may be such that the center of gravity of said assembly is offset horizontally from the pivot structure of the test drilling rig, that is, said assembly is imbalanced. In this case said assembly will tend to maintain a stationary non-zero pivot angle relative to horizontal of the motion base, e.g. when at a hold. The pendulum system may therefore further comprise counterweight elements that can be added to said assembly to obtain a balance relative to the pivot axis. For example, the counterweight elements may have a total weight between 10 and 500 metric tonnes to with a weight per element between 1 and 25 ton, e.g. 12.5 ton.

The pendulum system may further comprise load measurement means, e.g. a load measurement pin, adapted to determine the load imparted on the compound pendulum by an imbalance of the assembly of drilling tower, drilling tubulars storage and tubulars racker. In an embodiment the drilling rig pivot structure provides a single horizontal pivot axis, preferably intersecting the firing line, while the compound pendulum is swingable about one horizontal swing axis. Preferably, said horizontal pivot axis and said horizontal swing axis are substantially parallel.

In another embodiment, the compound pendulum is suspended from a pivot allowing rotation about two horizontal rotation axes, with the compound pendulum being able at each point in time to swing about one or the other rotation axis. For example, after a rotation about one rotation axis has been maintained for a certain amount of time, the compound pendulum can be made to swing about the other rotation axis.

In another embodiment the motion base is pivotable about two axes, e.g. orthogonal, e.g. to simulate both roll and pitch motion of a vessel on which a similar rig can be mounted, with a dedicated drive to cause the pivoting motion about each axis. For example two pendulum systems are provided, operating at orthogonal axes.

In yet another embodiment, the compound pendulum is suspended from a pivot with the horizontal swing axis being any axis in the horizontal plane. In this embodiment the horizontal swing axis can be altered during swinging of the compound pendulum and/or after bringing the assembly of compound pendulum, strut, motion base, drilling tower, drilling tubulars storage and tubulars racker device to hold.

The pendulum system may further comprise locking means, e.g. a lock pin that locks the compound pendulum to the frame, to prevent cyclic motion of the assembly of compound pendulum, strut, motion base, drilling tower, drilling tubulars storage and tubulars racker device. For example, while the abovementioned weight elements are added to or removed from the compound pendulum the lock pin may prevent motion of said assembly.

To prevent pivotal motion of the test drilling rig about its pivot axis or axes one or more temporary supports, such as hydraulic jacks, can be placed underneath the motion base at positions offset from the pivot axis. Tests may also be performed after placing the motion base at a stationary non-zero pivot angle and whilst keeping said non-zero angle.

The frame of said pendulum system may comprise a plurality of frame parts adjustable relative to one another, e.g. by means of pivot points or telescopic elements, in order to adjust the position of the pivot point that connects strut and compound pendulum and thereby to impart to the motion base a non-zero pivot angle relative to horizontal. A locking means, e.g. said lock pin may be used to maintain said stationary non-zero pivot angle of the motion base. The stationary no-zero pivot angle relative to horizontal may be between 0.1° and 10°.

The pendulum system may further provide braking means, e.g. a friction brake device, a eddy current brake device, a flywheel, etc., to bring the assembly of compound pendulum, strut, motion base, drilling tower, drilling tubulars storage and tubulars racker device to hold.

In a preferred embodiment the pivot structure is attached to the foundation at two positions and therefore comprises front pivot structure and a rear pivot structure. The test drilling rig then comprises two pivot pins, one provided onto the front pivot structure and one onto the rear pivot structure, and the motion base comprises two pivot connection elements pivotally connected to the pivot pins, one mounted on the front pivot pin and one on the rear pivot pin.

In a preferred embodiment the motion base further comprises two beams placed substantially parallel to the pivot axis and substantially parallel to each other at a distance from each other, each rigidly attached to a side surface of the front pivot connection element and a side surface of the rear pivot connection element. The beams extend beyond the front pivot element to allow tools to be used on drilling activities to be placed in the region between the two beams and supported by said beams. The beams furthermore extend beyond the rear pivot element to allow winches to be placed in the region between the two beams and supported by said beams.

In a preferred embodiment the motion base further comprises one or more drilling tubular storage frames adapted to support one or more drilling tubular storages and/or one or more counterweight element frames adapted to hold counterweight elements. Said counterweight elements allow the assembly of motion base, drilling tower, tubulars racker device and drilling tubular storage to be balanced. If one drilling tubular storage on a drilling tubulars storage frame is provided at one side of the pivot axis the counterweight element frame is provided at the other side of said pivot axis. The motion drive can be placed at either side of the pivot axis.

In an embodiment the drilling tower comprises one or more vertical rails and a trolley that is vertically guided by said one or more rails, e.g. said trolley carrying and/or being adapted to carry a rotary topdrive device adapted to impart rotary drive to a drill string section.

In an embodiment the tower has a tower structure with the firing line outside of and alongside a side of the tower structure. For example the tower structure is a mast having a closed wall contour with the firing line along a side of the mast.

In an embodiment the tower comprises a heave compensator cylinder acting on a cable from which a load is suspended in the firing line, e.g. a drill string, e.g. via a crown block and a travelling block, e.g. from a trolley. For example the heave compensator cylinder is arranged in the interior of the mast. For a detailed description of a suitable heave compensation system, reference is made to WO0118350.

In another embodiment a second cylinder is provided, which is adapted and operated to simulate the heave that is to be compensated by the first heave compensator cylinder.

In an embodiment the second cylinder provides or simulates heave motion in the cable while the motion base is at a stationary substantially zero pivot angle relative to horizontal.

In another embodiment the second cylinder provides heave motion in the cable while the motion base is at a stationary substantially non-zero pivot angle relative to horizontal.

In yet another embodiment the second cylinder provides heave motion while the assembly of motion base, drilling tower, drilling tubular storage and tubulars racker device performs cyclic motion around its one or more pivot axes. Heave motion and roll motion are thus simulated simultaneously.

In an embodiment the tower structure is a latticed tower structure, e.g. providing a side facing the firing line covered with a panel, e.g. with said one or more vertical rails and trolley arranged at said panelled side of the latticed tower structure.

In an embodiment the drilling tower comprises a laterally extendable top section, e.g. on the mast of the drilling tower, to allow the position of the firing line to be adjusted. To this end the drilling tower comprises e.g. a fixed top frame with one or more rear pulleys to guide one or more cables from one or more winches over the top of the drilling tower and a movable top frame, said movable frame being movable with respect to the fixed top frame towards and away from the mast, e.g. along a direction substantially parallel to the pivot axis of the test drilling rig.

To impart the movement of the movable frame an actuator, e.g. a hydraulic cylinder, is provided. Furthermore, a locking mechanism to maintain the position of the movable top frame with respect to the fixed top frame may be provided.

In an embodiment the drilling tower further comprises one or more crown blocks, provided on, e.g. at the end of, the movable top frame approximately above the well, and one or more travelling blocks. The extension and retraction of the movable top frame of the drilling tower described above changes the position of the crown block(s) and travelling block(s) with respect to the mast of the drilling tower and thereby, as the firing line runs in the vertical direction through the center of the travelling block(s), changes the position of the firing line.

For example the possibility to vary the firing line position may be used in testing telescopic extensible arms of the tubulars racker device described below. These arms allow the movement of drilling tubulars into the firing line and by changing the position of the firing line these arms can be subjected to different test conditions. In this way the effect of sea state induced motion on drilling rigs with differing distances from the mast to the firing line can be simulated and the impact on related equipment, like racker devices, evaluated.

In an embodiment the tubulars storage device is a vertical axis carousel adapted for storage of drilling tubulars, e.g. drill pipe stands, casing stands, etc., in vertical orientation therein.

In an embodiment the rig comprises a drill floor and a tubulars string slip device, e.g. on said drill floor, which slip device is adapted to support the weight of a tubulars string, e.g. a drill string, suspended therefrom along the firing line, e.g. in the well.

In an embodiment the rig comprises a tower structure with the firing line outside of and alongside a side of the tower structure, and the rig comprises two tubulars storage devices for vertical storage drilling tubulars, said two tubulars storage structure being arranged at opposite sides of the tower structure different from the firing line side, wherein the rig comprises two tubulars racker devices each associated with one of the two storage devices, and each being configured to move drilling tubulars between the associated storage device and the firing line, wherein the two storage devices are positioned at opposite sides of the drill floor.

In an embodiment the rig comprises an operator's cabin that is stationary mounted, e.g. on the foundation.

In an embodiment the tubulars racker device comprises:
a vertical rail mounted on said tower,
one or more motion arm assemblies mounted on said vertical rail,
wherein each motion arm assembly comprises a base that is vertically mobile along said vertical rail by a vertical drive including a motor, and a motion arm connected to said base, the motion arm of at least one arm assembly being provided with a tubular gripper member connected to said arm.

For example the motor of the vertical drive of at least one motion arm assembly supporting a tubular gripper member is connected to a heave motion compensation controller to simulate a heave motion synchronization of the tubular gripper member.

In an embodiment the rig comprises a roughneck system with a vertical rail, and a motion arm assembly mounted on said vertical rail, wherein the motion arm assembly comprises a base that is vertically mobile along said vertical rail by a vertical drive including a motor, and a motion arm connected to said base, the motion arm of at least one arm assembly being provided with a roughneck device. For example the motor of the vertical drive is connected to a heave motion compensation controller to simulate a heave motion synchronization of the roughneck device.

In an embodiment the vertical rails comprises a vertical toothed rack, with a mobile base of a motion arm assembly having one or more motor driven pinions engaging the toothed rack. In an embodiment the motion arm is a telescopic extensible arm, the arm having a first arm segment which is connected to the base via a vertical axis bearing allowing the motion arm to revolve about said vertical axis. In a structurally simple embodiment the vertical axis forms the only axis of revolution of the arm. The arm further comprises one or more telescoping additional arm segments, e.g. with interposition of a hydraulic cylinder to cause the extension and retraction of the arm.

In an embodiment the rig comprises a well center tools storage structure that is adapted to store therein the one or more well center tools that are connectable to the motion arm of a motion arm assembly.

The present invention also relates to a method for performing a test wherein use is made of a land based dynamic sea motion simulating test drilling rig comprising:
a soil bound foundation,
a pivot structure secured to said foundation, said pivot structure providing at least one horizontal pivot axis,
a motion base mounted on said pivot structure and pivotable about said at least one horizontal pivot axis relative to the foundation for simulating a sea state induced motion,
a drilling tower erected on said motion base and having a foot that is secured to said motion base, the drilling tower being provided with a hoisting device adapted to manipulate a drill string section in a vertical firing line,
a drilling tubulars storage adapted for vertical storage of one or more drilling tubulars, said tubulars storage secured to said motion base,
a tubulars racker device arranged and configured to move drilling tubulars between the drilling tubulars storage and the firing line allowing for assembly and disassembly of a drill string section in the firing line,
a motion drive adapted to impart cyclic pivoting motion about said at least one horizontal pivot axis to the assembly of the drilling tower, drilling tubulars storage, and tubulars racker device in order to simulate said assembly being subjected to sea state induced motion.
in which method said motion drive imparts a cyclic pivoting motion about the at least one, or only one, horizontal pivot axis to the assembly of the drilling tower, drilling tubulars storage, and tubulars racker device in order to simulate said assembly being subjected to a sea state induced motion.

In an embodiment of said method a well is present that is sunken into the soil and aligned with the firing line, and the method comprises, whilst said motion drive imparts said cyclic pivoting motion, the lowering of a drill string section by said hoisting device into said well. The well may have one or more of the features discussed herein, e.g. allowing for swaying motion of a drilling tubulars section suspended from a slip device on a drill floor of the rig in the ample sized well.

In an embodiment of said method said motion drive imparts a cyclic pivoting motion having a period in a range between 2 and 30 seconds.

In an embodiment of said method said motion drive imparts a cyclic pivoting motion having a pivot angle relative to vertical of at least +/−1° and at most +/−10°.

In an embodiment the method comprises, whilst said motion drive imparts said cyclic pivoting motion, the transfer of drilling tubular stands by said tubulars racker device between the tubulars storage and a position aligned with the firing line.

In an embodiment the method comprises, whilst said motion drive imparts said cyclic pivoting motion, the making up and/or breaking up of a tubulars string in the firing line.

The present invention also relates to a method wherein during said cyclic pivoting of the assembly one or more of the following actions are performed:
assembly of a tubulars string in the firing line, e.g. including lowering the assembled string into the well when present,
disassembly of a tubular string in the firing line, e.g. including raising the string from the well when present,
placement of tubulars, e.g. tubular stands, in the storage device by means of the tubulars racker device.
retrieval of tubulars, e.g. tubular stands, from the storage device by means of the tubulars racker device.

For example in an embodiment of the method a roughneck device of the rig is used, whilst said cyclic motion takes place, in the make-up and/or break up of a drilling tubulars string in the firing line. For example a slip device on a drill floor of the rig holds a tubular or tubular stand suspended below the drill floor, e.g. into the well when present, and the tubulars racker device is used to bring a tubulars stand above the top end of the suspended tubular in the firing line. Then the roughneck is used to connect the new stand to the suspended tubular. This may also involve connecting the top end of the new tubulars stand to a rotary top drive device of the rig when present.

The present invention also relates to a method wherein during prolonged, e.g. multiple hours or multiple days, a tubular stand is held by said tubular racker device in the firing line whilst the motion drive imparts said cyclic pivoting motion. This test e.g. may reveal long-time behaviour of the tubular racker device.

The present invention also relates to a method wherein the cyclic motion includes a continuous variation of the period of said cyclic motion during a test program.

The present invention also relates to a method wherein the well is filled with a substrate, e.g. sand or water, and wherein a tubulars string is lowered into said well and/or raised from said well, e.g. the string having a drilling head to drill a wellbore in the substrate, said lowering/raising being done whilst the motion drive imparts said cyclic pivoting motion.

The present invention also relates to a method for designing a component of a drilling rig as discussed herein, wherein a prototype of said component is mounted in said drilling rig and subjected to a one or more tests using said drilling rig with said cyclic pivoting motion, the prototype being removed and analysed, the results being used in the design process.

The present invention also relates to a land based dynamic sea motion simulating test rig comprising:
a foundation,
a pivot structure secured to said foundation, said pivot structure providing at least one horizontal pivot axis,
a motion base mounted on said pivot structure and pivotable about said at least one horizontal pivot axis relative to the foundation for simulating a sea state induced motion,
a tower erected on said motion base and having a foot that is secured to said motion base, the tower being provided with a hoisting device adapted to manipulate a load in a vertical firing line,
a tubulars racker device arranged and configured to move drilling tubulars between a drilling tubulars storage and the firing line,
a motion drive adapted to impart cyclic pivoting motion about said at least one horizontal pivot axis to the tower and tubulars racker device in order to simulate said tower and tubulars racker device being subjected to said sea state induced motion.

In this design a tubulars storage device may or may not be present on the pivoting assembly. In absence of such a storage device on can envisage that a tubulars stand is e.g. hoisted by a crane so that the stand can be gripped by the tubulars racker device, which latter device can then be operated to perform its normal racker motions whilst the motion drive imparts said cyclic pivoting motion. In this manner the behaviour of the racker device may be tested, e.g. in view of obtaining data that will lead to a further design improvement of the racker device and/or data that allow for design of the motion control, e.g. the algorithms, of the racker device.

In an embodiment the tower, the hoisting device thereof, and the tubulars racker device are adapted to handle drilling tubular stands having a length greater than 90 feet. It will be appreciated that sea state induced motion is of particular relevance when handling long tubular stands, e.g. of lengths of 120, 150, or even 180 feet.

In an embodiment the tower comprises one or more vertical rails and a trolley that is vertically guided by said one or more vertical rails, said trolley carrying a rotary topdrive device adapted to impart rotary drive to a drill string section in the firing line.

In an embodiment the motion base is provided with a drill floor having a well center therein through which the firing line passes.

The present invention also relates to a land based dynamic sea motion simulating test rig for use in testing of a tubulars racker device, said rig comprising:
a tower that is pivotal about at least one horizontal pivot axis for simulating a sea state induced motion,
a tubulars racker device connected to said tower,
a motion drive adapted to impart cyclic pivoting motion about said at least one horizontal pivot axis to the assembly of the drilling tower and tubulars racker device in order to simulate said assembly being subjected to said sea state induced motion.

In an embodiment the tower and the tubulars racker device are adapted to handle drilling tubular stands having a length greater than 90 feet.

In an embodiment said motion drive is adapted to impart a cyclic pivoting motion having a period in a range between 2 and 30 seconds.

In an embodiment the motion drive is adapted to impart a variable pivot angle in a range between +/−1° and +/−10°.

In an embodiment the tubulars racker device comprises:
a vertical rails mounted on said tower,
one or more motion arm assemblies mounted on said vertical rails,
wherein each motion arm assembly comprises a base that is vertically mobile along said vertical rails by a vertical drive including a motor, and a motion arm connected to said base, the motion arm of at least one arm assembly being provided with a tubular gripper member connected to said arm.

In an embodiment the tower comprises one or more vertical rails and a trolley that is vertically guided by said one or more vertical rails, said trolley carrying a rotary topdrive device adapted to impart rotary drive to a drill string section in the firing line.

In an embodiment the tower is provided with a drill floor having a well center therein through which the firing line passes.

The present invention also relates to a land based dynamic sea motion simulating test drilling rig, said rig comprising:
a drilling tower erected on a motion base that is pivotal about at least one horizontal pivot axis for simulating a sea state induced motion, wherein the tower comprises one or more vertical rails,
a trolley vertically guided by said one or more rails,
a rotary topdrive device carried by said trolley and adapted to impart rotary drive to a drill string section,
a drill floor on said motion base, said drill floor having a well center,
a tubulars string slip device arranged at said well center,
a motion drive adapted to impart cyclic pivoting motion about said at least one horizontal pivot axis to the assembly of the drilling tower, trolley, rotary topdrive device, drill floor, and tubulars string slip device in order to simulate said assembly being subjected to said sea state induced motion.

The present invention also relates to a land based dynamic sea motion simulating test drilling rig, said rig comprising:
a drilling tower erected on a motion base that is pivotal about at least one horizontal pivot axis for simulating a sea state induced motion, and
a pendulum system comprising:
a frame secured to a soil bound foundation, e.g. a pile foundation comprising multiple piles,
a compound pendulum suspended from said frame, the compound pendulum rotatable or swingable relative to the frame about at least one horizontal swing axis,
a strut having an end, e.g. an upper end, pivotally attached to the drilling tower, e.g. at an elevated position thereof, and having another end, e.g. a lower end, pivotally connected to the compound pendulum by means of a pivot connector providing a pivot point that is offset from said at least one swing axis between the compound pendulum and frame,
a drive motor,
wherein the drive motor is adapted to supply energy to impart a cyclic motion to the assembly of compound pendulum, strut, drilling tower, said cyclic motion having a frequency that is equal to the resonance frequency of the assembly.

The present invention also relates to method for performing a test of drilling equipment, e.g. one or more of a tubular racker device, a rotary topdrive device, a roughneck device, a slip device, and a motion arm assembly, in which method use is made of a land based dynamic sea motion simulating test drilling rig as described herein.

The invention will now be discussed with reference to the drawings.

DETAILED DESCRIPTION OF EMBODIMENTS

Figures 1, 2:
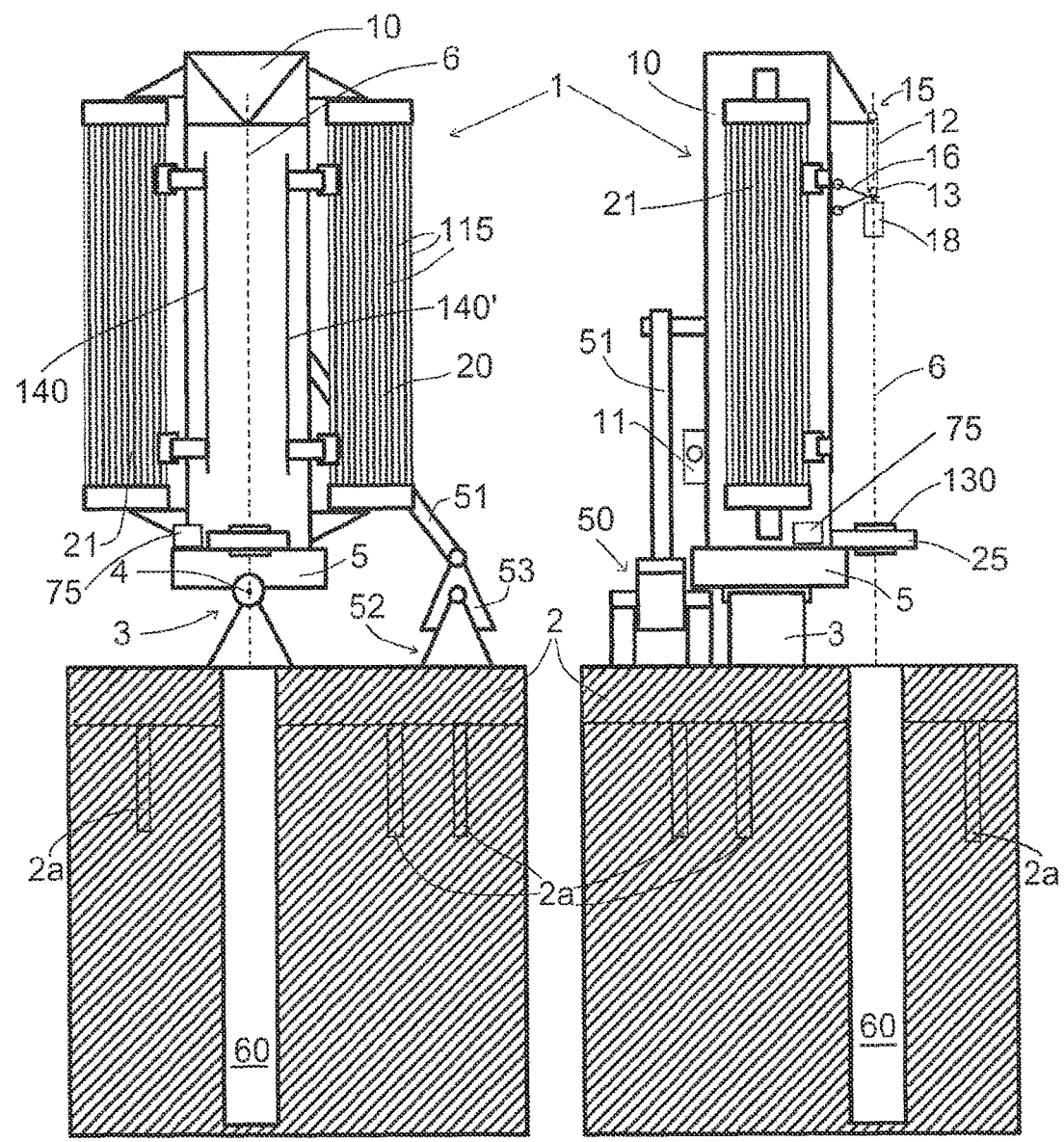
FIG. 1 shows schematically a land based dynamic sea motion simulating test drilling rig according to the invention.
FIG. 2 shows the test drilling rig of FIG. 1 in a different direction, as well as the well.
Figure 3:
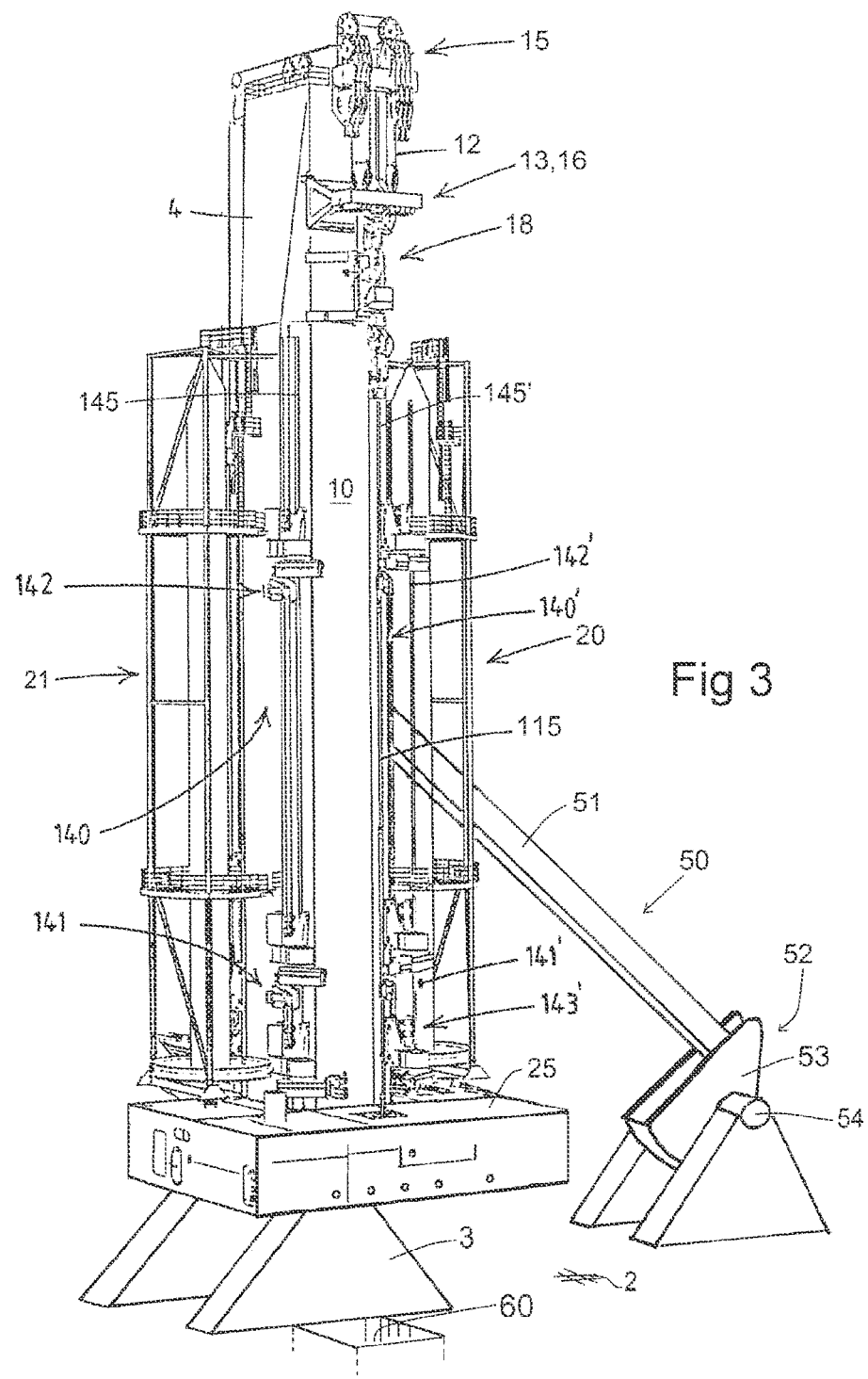
FIG. 3 shows in perspective view an example of the test drilling rig according to FIG. 1.

With reference to the drawings embodiments and optional features of a land based dynamic sea motion simulating test drilling rig 1 will be described.

The rig 1 comprises a soil bound foundation 2, e.g. a pile foundation comprising multiple piles 2a and a concrete foundation bed connected to said piles, e.g. concrete piles.

The rig 1 further comprises a pivot structure 3 that is secured to the foundation 2. As is preferred, the pivot structure 3 provides a single horizontal pivot axis 4.

A motion base 5 is mounted on the pivot structure 3 and is pivotable about the horizontal pivot axis 4 relative to the foundation 2, e.g. allowing to simulate sea state induced roll motion when the rig would be installed appropriately on a floating drilling vessel.

A drilling tower 10 is erected on the motion base 5. Here, as discussed herein, the tower has a tower structure embodied as a mast with a firing line 6 alongside and to the outside of the mast 10. The mast 10 has a foot that is secured to the pivotal motion base 5.

The drilling tower 10 is provided with a hoisting device that is adapted to manipulate a drill string section in the vertical firing line 6.

The hoisting device comprises a hoisting winch 11 and cable 12 connected to winch 11. A travelling block 13 is suspended from the cable 12, e.g. with a multiple fall arrangement between crown block 15 and the travelling block 13.

The travelling block 13, as is preferred, supports a trolley 16 that is guided along vertical rails 17 extending along the side of the mast 10 facing the firing line 6. The trolley 16 carries a rotary topdrive device 18 that is adapted to impart rotary drive to a drill string section.

The rig 1 further comprises a drilling tubulars storage, here a rotary storages 20, 21, that are each adapted for vertical storage of drilling tubulars, e.g. drill pipe stands. The tubulars storages 20, 21 are of the known carousel type in this example, but other embodiments with parallel setback slots are also envisaged. In an embodiment the rig 1 only has one such rotary storage, e.g. with a small stationary storage replacing the other rotary storage shown herein.

The drilling tubulars rotary storage rack 20, 21 is rotatable mounted so as to rotate about a vertical axis.

As is known in the art the drilling tubulars rotary storage rack 20, 21 includes slots for the storage of multiple tubulars in each drilling tubulars rotary storage rack in vertical orientation. As is known in the art the rack 20, 21 here includes a central vertical post and multiple disc members at different heights of the post, at least one disc being a fingerboard disc having tubulars storage slots, each slot having an opening at an outer circumference of the fingerboard disc allowing to introduce and remove a tubular from the storage slot. It is envisaged that in a preferred embodiment the tubulars rest with their lower end on a lowermost disc member. In the example shown it is envisaged that triple stands are stored in the rack 20, 21. The diameter of rack may be about 8 meters.

A drive motor is present for drilling tubulars rotary storage rack 20, 21 that allow to rotate the drilling tubulars storage rack about its vertical axis.

The rig 1 also comprises a tubulars racker device, here two such devices 140, 140', each arranged and configured to move drilling tubulars between the drilling tubulars storage device 20, 21 and the firing line 6 allowing for assembly and disassembly of a drill string section in the firing line. Here the two tubular racking devices 140 and 140' are each mounted at a corner of the mast 10.

The rig 1 further comprises a motion drive 50 adapted to impart cyclic pivoting motion about the horizontal pivot axis 4 to the assembly of the drilling tower 10, drilling tubulars storages 20, 21, and tubulars racker devices 140, 140' in order to simulate this assembly being subjected to sea state induced motion, e.g. to roll motion.

The motion drive 50 comprises a strut 51 having an upper end pivotally attached to the drilling tower 10 at an elevated position thereof and having a lower end pivotally attached to a drive motor device 52. For example the drive motor device comprises a motor driven rocker arm 53 that is pivotally connected to the strut 51 and adapted to perform a cyclic rocking motion about a horizontal rocker arm axis 54.

The motion drive may be adapted to impart a cyclic pivoting motion having a period in a range between 2 and 30 seconds.

The motion drive may be adapted to impart a cyclic pivoting motion having a pivot angle relative to vertical of at least +/−1°.

As is preferred the single horizontal pivot axis 4 intersects the firing line 6.

Counterweight elements 75 may be provided to the drilling tower 10, drilling tubulars storage 20, 21 or tubulars racker device 140,140' to balance the assembly of drilling tower 10, drilling tubulars storage 20, 21 and tubulars racker device 140,140' relative to axis 4. For example the total mass of the counterweight elements 75 can be adjusted in view of variation of the mass of tubulars stored in the storage, e.g. when just one storage is present at one side of the tower.

The rig further comprises or is associated with a well 60 that is sunken into the soil at a position aligned with the firing line 6, e.g. a concrete lined well. The well 60 has a diameter greater than of drilling tubulars storable in the tubulars storage device, e.g. a diameter of at least one meter.

A drill floor 25 may be provided, having a well center or opening therein through which a drill string passes into the well 60, along the firing line 6.

As is preferred each racking device 140, 140' has multiple, here three motion arm assemblies. Here a lower first racker motion arm assembly 141, 141' is provided as well as a second racker motion assembly 142, 142', operable at a greater height than the first tubular racker assembly. Also a third well center tool motion arm assembly 143, 143' is provided Each set of motion arm assemblies is arranged on a common vertical rail 145, 145' that is fixed to the mast 4, here each at a corner thereof.

Figure 4:
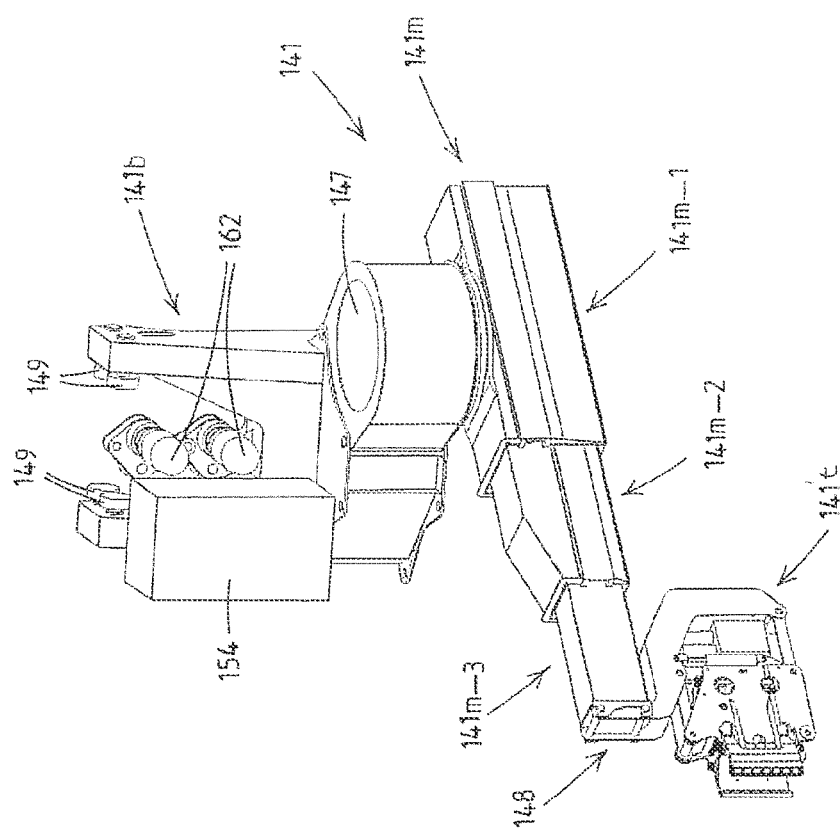
FIG. 4 shows a racker assembly of rig of FIG. 3.
Figure 5:
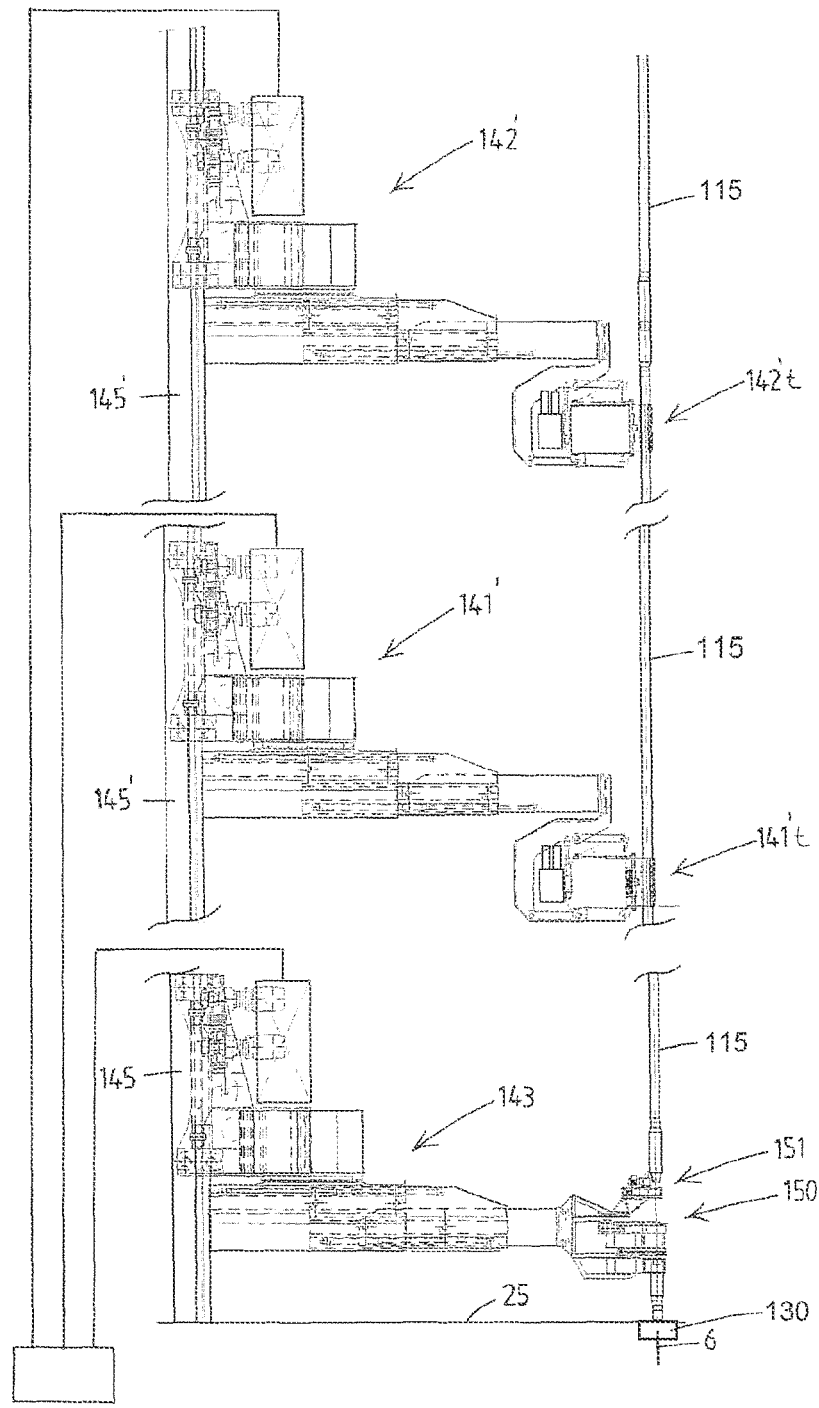
FIG. 5 illustrates the handling of a tubular by means of the racker assemblies with the lower assembly supporting an iron roughneck device.

As can be best seen in the depiction of FIG. 4, a drill pipe multi-joint tubular 115 is held by racker assemblies 142' and 141' in the firing line 6, thereby allowing to connect the tubular stand 115 to the drill string supported, e.g., by drill string slip device 130. Each of said assemblies 142' and 141' carries a tubular gripper member 142't and 141't at the end of the motion arm of the assembly. Instead of both assemblies carrying a gripper member it is also possible that only one arm is provided with a gripper member that supports the weight of the gripped tubular and the other arm carries a centralizer that holds the tubular in the upright position.

The lower motion arm assembly 143 of the other racker device 140 carries an iron roughneck device 150, here with a spinner 151 thereon as well.

The motion arm 141m is here embodied a telescopic extensible arm, the arm having a first arm segment 141m-1 which is connected to the base 141b via a vertical axis bearing 147 allowing the motion arm 141m to revolve about this vertical axis. As is preferred this vertical axis forms the only axis of revolution of the motion arm. The motion arm has two telescoping additional arm segments 141m-2 and 141m-3, with the outer arm segment being provided with a connector 148 for a tubular gripper 141't and/or a well center tool (e.g. iron roughneck device 150).

Close to or on the drill floor the rig may have a well center tools storage structure that is adapted to store therein the one or more well center tools, e.g. an iron roughneck device 150, 150' that are connectable to the motion arm of the lowermost motion arm assembly 143, 143'.

Each tubular racking device comprises a vertical guide rail 145 onto which corresponding guide members of the base 141b of each tubular racker assembly engage. In this example the base 141b carries four sets of each three rollers 149 of which two rollers 149 ride along opposed faces of a flange of the rails 145 and one roller rides along a lateral side of the flange.

The racking device further comprises a vertical toothed rack 160 arranged parallel to this vertical guide rails 145.

Here the toothed rack 160 is mounted on the rail 145, here on a front plate of the rail between the two flanges of the rail 145.

The base 141b of the tubular racker assembly 141 is provided with one or more, here two, pinions engaging with this vertical toothed rack. The base is provided with one or more motors 162, here two, driving the pinions, so as to allow for a controlled vertical motion of the racker assembly 141.

As is preferred the one or more motors 162 driving the one or more pinions are electric motors.

The motion arm assembly 143 holds iron roughneck device 150 above the well center for make-up or breaking up of connections between tubulars in the firing line 5. At the same time the other motion arm assembly 143' can be equipped with a second iron roughneck device, which is then already prepared for handling different diameter tubulars.

As is preferred due to weight considerations the mast of the tower structure is a latticed tower structure and the firing line 6 is outside of and alongside a side of the tower structure. The side facing the firing line is covered with a panel.

An operator's cabin can be mounted stationary on the foundation.

Figure 6:
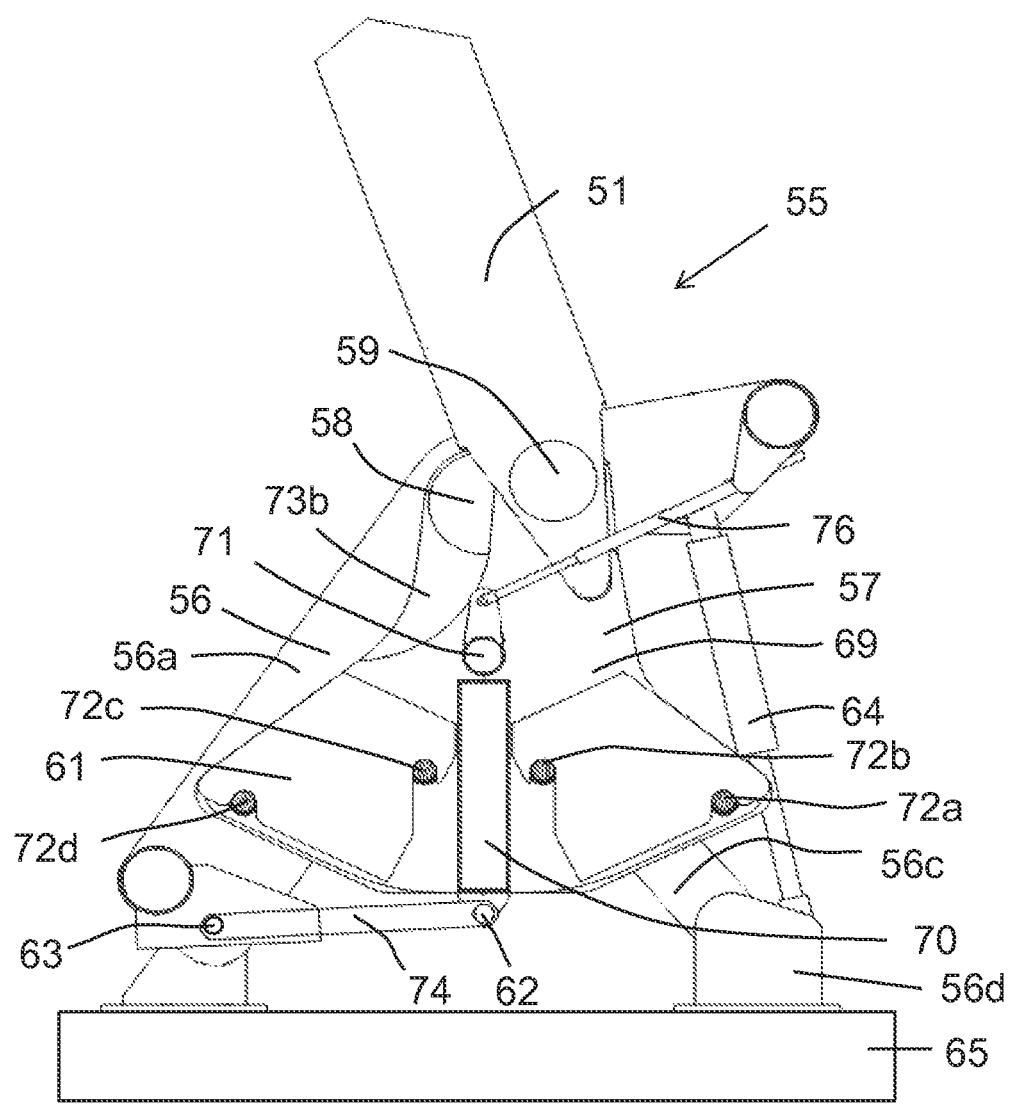
FIG. 6 shows a pendulum system according to the invention.
Figure 7:
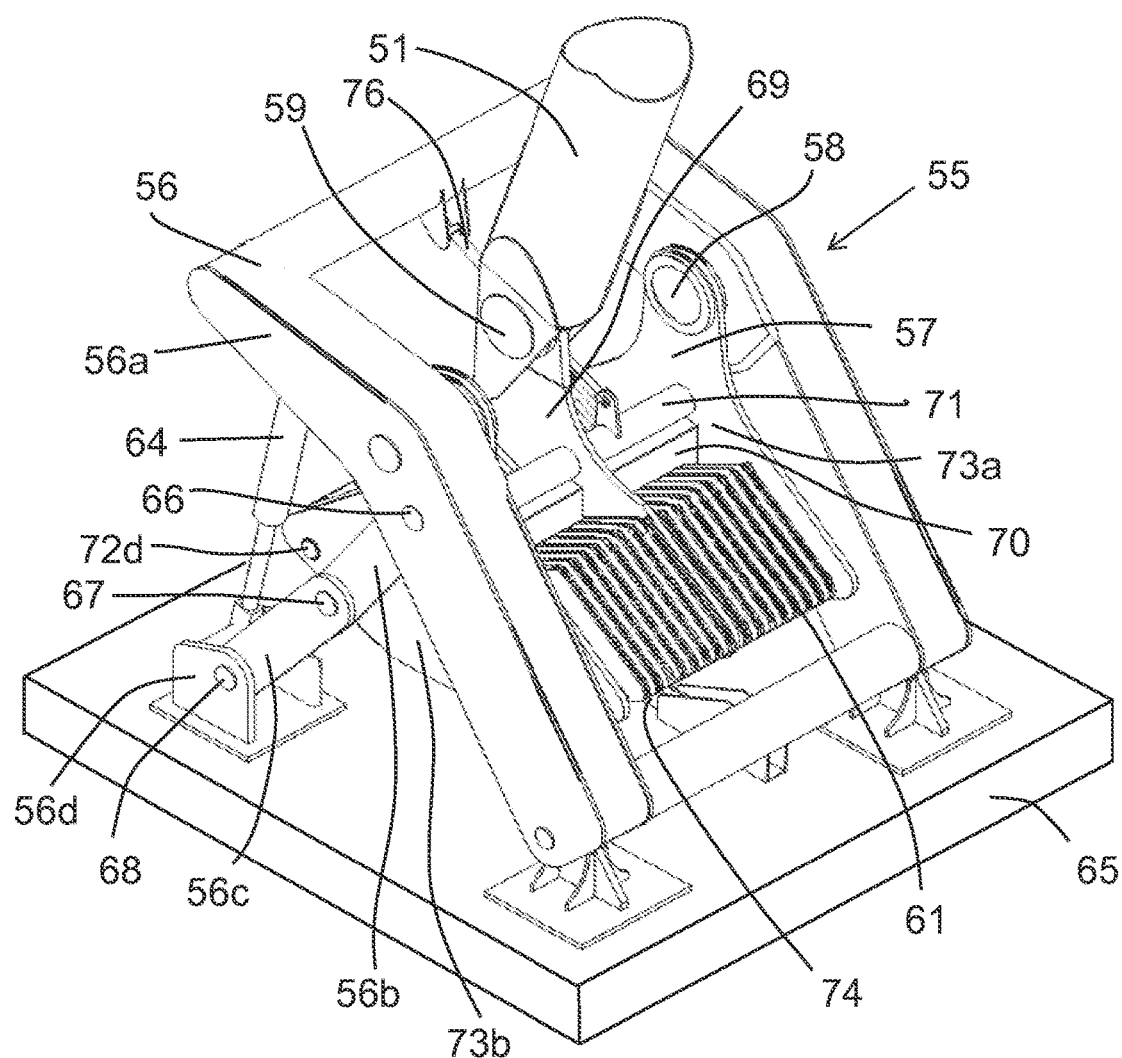
FIG. 7 shows in perspective view an example of the pendulum system according to FIG. 6.

With reference to FIGS. 6 and 7 an embodiment of the pendulum system will be discussed.

The pendulum system 55 comprises a soil bound foundation 65, e.g. a pile foundation comprising multiple piles, e.g. like piles 2a, and a concrete foundation bed connected to said piles, e.g. concrete piles.

The pendulum system 55 further comprises a frame 56 secured to the foundation 65. Preferably, the frame is a metal frame. The frame may have a height between 1 and 8 meters, e.g. about 6 meters.

A compound pendulum 57 is suspended from said frame 56 and is swingable relative to the frame about at least one horizontal swing axis 58, e.g. allowing the compound pendulum 57 to swing.

For example, the compound pendulum 57 has a height between 1 and 5 meters.

The pendulum system 55 further comprises a strut 51 having an upper end pivotally attached to the drilling tower at an elevated position thereof and having a lower end pivotally attached to the compound pendulum by means of a pivot point 59.

The pendulum system 55 further comprises a drive motor 76. The drive motor 76 is adapted to supply energy to impart a cyclic motion to the assembly of compound pendulum 57, strut 51, motion base 5, drilling tower 10, drilling tubulars storage 20, 21 and tubulars racker device 140, 140', said cyclic motion having a frequency that is equal to the resonance frequency of the assembly. The cyclic motion imparted to the assembly of the drilling tower 10, drilling tubulars storage 20, 21 and tubulars racker device 140, 140' is a cycling motion is about said at least one horizontal pivot axis 4 of the pivot structure 3.

As is preferred, the drive motor 76 comprises a hydraulic cylinder. In the shown embodiment said hydraulic cylinder 76 is connected at one end to the frame 56 and at the other end to the compound pendulum 57.

The pendulum system may further comprise weight elements 61 that can be added to and removed from the compound pendulum 57 to adjust the resonance frequency and/or acceleration of the assembly of compound pendulum 57, strut 51, motion base 5, drilling tower 10, drilling tubulars storage 20,21 and tubulars racker device 140,140'.

In the shown embodiment the compound pendulum 57 with weight elements 61 comprises:

two spaced apart side plates, here bell-shaped metal side plates 73a, 73b, wherein both side plates 73a, 73b are rotatably connected to the frame 56 about a single horizontal swing axis 58, a metal bar or beam 70 attached to at its ends to the side plates, wherein the metal bar or beam 70 is positioned substantially at the symmetry axis of the plates 73a, 73b, a center plate 69, placed in between and parallel to the two side plates 73a, 73b, and attached to the bar 70, wherein the strut 51 is pivotally attached to the center plate by means of a pivot connector providing a pivot point 59 that is offset from the single horizontal rotation axis 58, a rod 71 positioned above the metal bar 70, wherein the rod 71 is attached to both bell-shaped metal plates 73a, 73b and the center metal plate 69, and wherein the drive motor 76 is connected to said rod 71, suspension rods 72a, 72b, 72c, 72d positioned to the sides of and parallel to the bar 70 and attached to both bell-shaped metal plates 73a, 73b and to the center metal plate 69, metal plate weight elements 61 containing recesses that allow the metal plate weight elements 61 to be hung in the areas between the bell-shaped metal side plates 73a, 73b and the center plate 69 by letting them rest on the suspension rods 72a, 72b, 72c, 72d and against the metal bar 70.

The drilling rig pivot structure 3 may, as preferred, provide a single horizontal pivot axis 4 while the compound pendulum 57 is swingable about one horizontal swing axis 58. An embodiment of the compound pendulum swingable about one horizontal swing axis 58 is shown in FIGS. 6 and 7. Preferably said horizontal pivot axis 4 and said horizontal swing axis 58 are substantially parallel.

For example, the weight of the compound pendulum 57 comprising weight elements 61 is between 100 ton and 500 ton, e.g. variable between 150 tonnes and 300 tonnes by means of the weight elements.

In the shown embodiment the frame comprises a link 74 having one end attached to the frame 56 and allowing the other end to be attached to the compound pendulum 57 by means of the lock pin 62. Said lock pin or other lock member locks the compound pendulum 57 to the frame 56, to prevent motion of the assembly of compound pendulum 57, strut 51, motion base 5, drilling tower 10, drilling tubulars storage 20, 21 and tubulars racker device 140, 140', e.g. when the rig is not in use or when static tests are performed.

The lock pin 62 should be removed or disengaged to allow cyclic motion of the compound pendulum 57 relative to the frame 56.

The pendulum system 55 may further comprise load measurement means 63, e.g. a load measurement pin, to determine the load imparted on the compound pendulum 57 by an imbalance of the assembly of drilling tower 10, drilling tubulars storage 20,21 and tubulars racker device 140,140'.

In the shown embodiment the frame 56 comprises frame parts 56a, 56b, 56c, 56d, which are pivotally attached at pivot points 66, 67, 68, in order to adjust the position of the pivot point 59 that connects strut 51 and compound pendulum 57 and thereby to impart to the motion base 5 a stationary non-zero pivot angle relative to horizontal. In the shown embodiment the relative positions of said frame parts is driven by hydraulic cylinder 64.

The pendulum system 55 may further comprise braking means 76 to bring the assembly of compound pendulum 57, strut 51, motion base 5, drilling tower 10, drilling tubulars storage 20, 21 and tubulars racker device 140,140' to hold. In the shown embodiment the hydraulic cylinder 76 also acts as a braking means when suitably operated.

Figure 8:
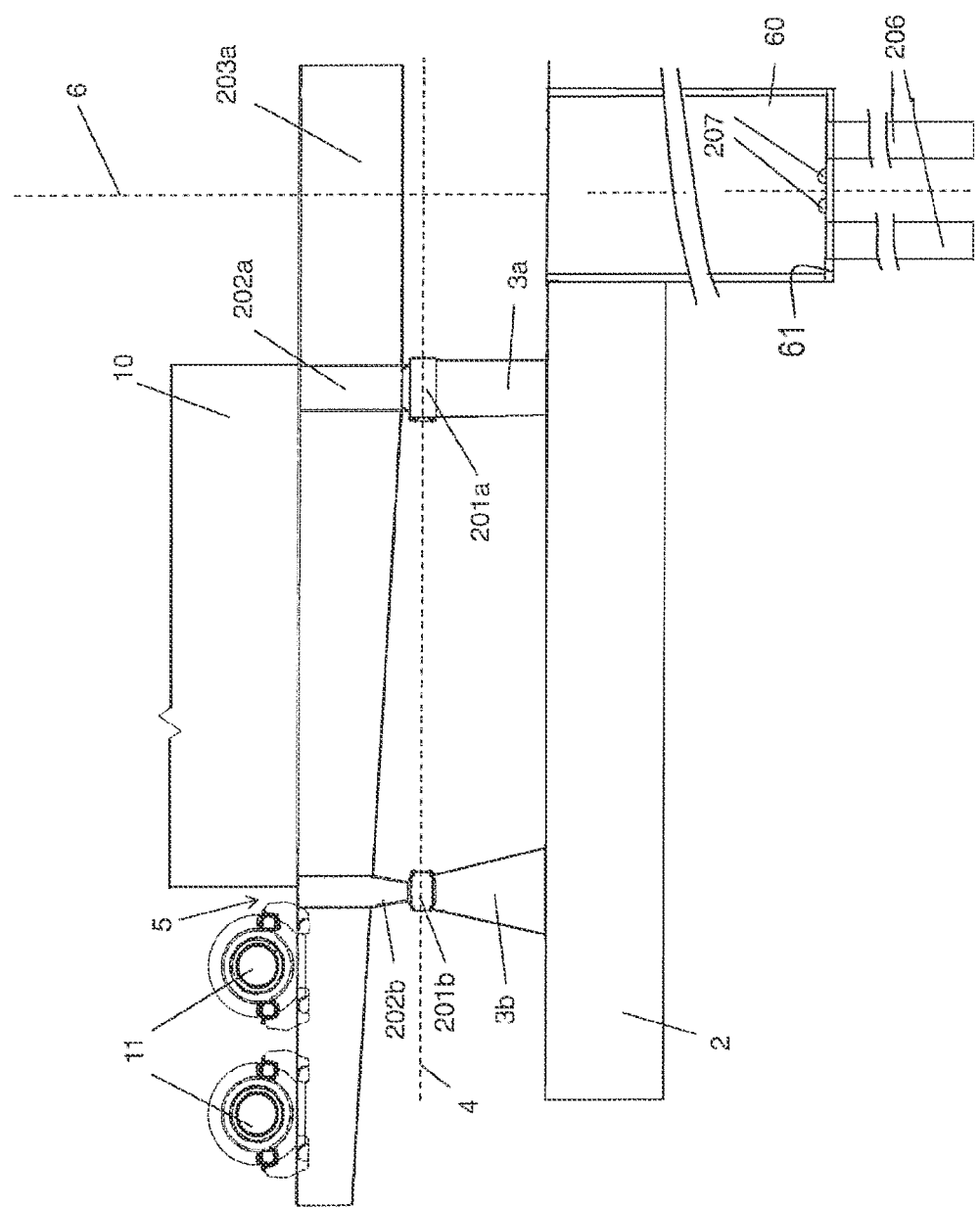
FIG. 8 shows in a side view an example of a preferred embodiment of the pivot structure and motion base of the test drilling rig according to the invention.
Figure 9:
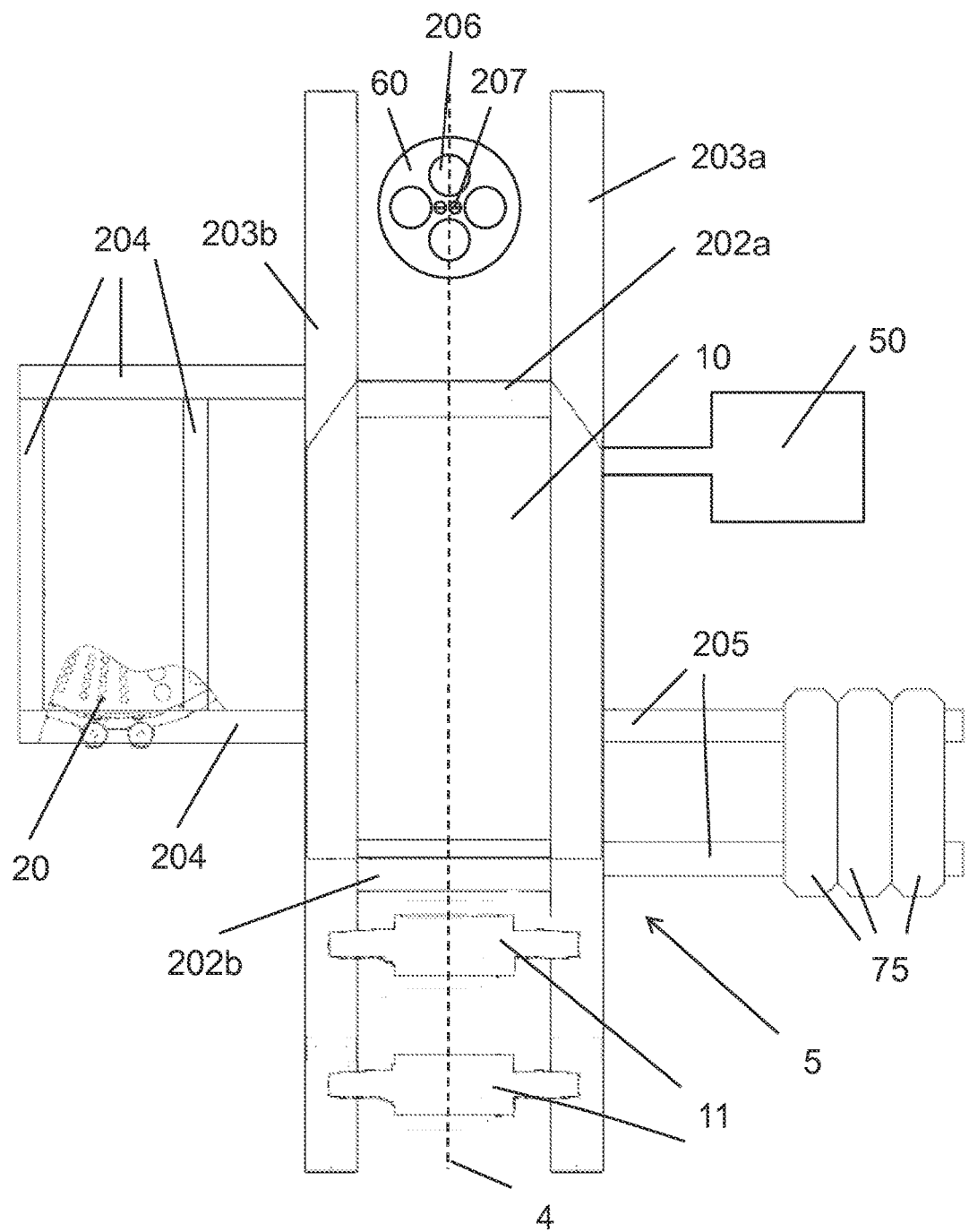
FIG. 9 shows in a top view an example of the pivot structure and motion base of FIG. 8
Figure 10:
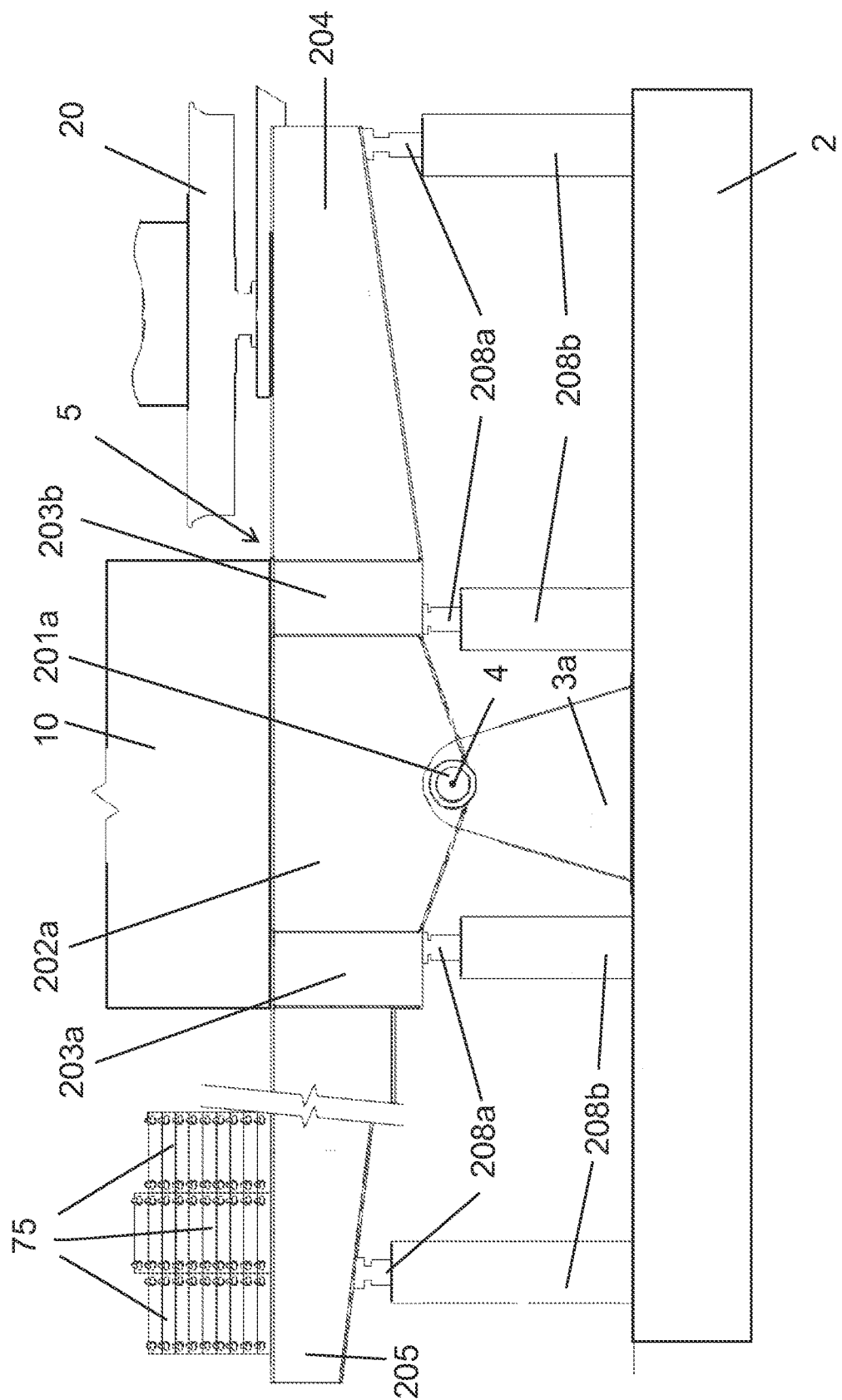
FIG. 10 shows the test drilling of FIGS. 8 and 9 in a rear view.

With reference to FIGS. 8, 9 and 10 a preferred embodiment and details of pivot structure and motion base will be discussed.

The rig 1 comprises a soil-bound foundation 2 and secured to said foundation a pivot structure 3 including a front pivot structure 3a and a rear pivot structure 3b.

The rig 1 further comprises a single pivot axis 4 along which a front pivot pin 201a a rear pivot pin 201b are provided, both pins preferably being made of steel and e.g. having a diameter between 50 and 100 cm, e.g. 60 cm. Said front pivot pin 201 is provided on the front pivot structure 3a, said rear pivot pin on the rear pivot structure 3b. The rig 1 further comprises a motion base 5 mounted on the front pivot pin 201a and rear pivot pin 201b and pivotable about pivot axis 4 relative to the foundation. The rig 1 further comprises a motion drive 50 to impart cyclic motion about said pivot axis 4.

The motion base 5 comprises a front pivot connection element 202a, pivotally attached to the front pivot pin 201a, with a front surface facing the firing line and well 60 and two side surfaces and a rear pivot connection element 202b, pivotally attached to the rear pivot pin 201b, with a front surface facing the well 60 and two side surfaces.

The motion base 5 further comprises two beams 203a, 203b placed substantially parallel to the pivot axis 4 and substantially parallel to each other at a distance from each other, each rigidly connected to a side surface of the front pivot connection element 202a and a side surface of the rear pivot connection element 202b.

At one end the beams 203a, 203b extend beyond the front pivot element 202a over a distance exceeding the distance between the front pivot connection element 202a and the well 60, to allow one or more tools used in drilling activities, such as clamps or rotaries, to be placed in the firing line 6 by placing said one or more tools in the region between both beams 203a, 203b supported by said beams 203a, 203b, in order to perform tests on or using said one or more tools.

At the other end the beams 203a, 203b extend beyond the rear pivot connection element 202b, here to permit one or more winches 11 to be placed in the region between both beams 203a, 203b supported by both beam 203a, 203b.

For example the beams 203a, 203b each have a height between 1 and 3 m, a width between 0.5 m and 2 m and a length between 10 and 35 meter, e.g. about 25 m long, and are a distance of between 2 and 10 m apart, e.g. about 6 m.

The motion base 5 further comprises a drilling tubular storage frame 204 adapted to support drilling tubular storage 20, said drilling tubular storage frame being rigidly attached to one of two beams 203a,203b, here beam 203b. In the shown embodiment the frame extends primarily in the horizontal plane, e.g. between 5 and 10 m in both directions, and comprises two metal beams at right angles to beam 203b, interconnected by two beams parallel to beam 203b.

The motion base 5 further comprises a counterweight element frame 205 rigidly attached to beam 203a and extending substantially perpendicular to the pivot axis 4 in a substantially horizontal direction. The counterweight element frame 205 is adapted to hold counterweight elements 75 at a position offset horizontally from the pivot axis 4, for instance between 2 and 15 m offset horizontally from the pivot axis, e.g. 10 m. The counterweight element frame 205 is provided at the other side of the pivot axis than drilling tubular storage frame 204 to permit balancing the assembly of drilling tower 10, tubulars racker device 140,140' and drilling tubulars storage 20 by means of said counterweight elements 75.

In the shown embodiment the drilling tower 10 is supported by the front and rear pivot elements 202a, 202b and the two beams 203a, 203b.

To prevent pivotal motion of the test drilling rig 1 about its pivot axis 4, e.g. when the rig is not used and/or when static tests are performed, one or more temporary supports 208 can be placed underneath the motion base, e.g. underneath the beams 203a,203b, drilling tubulars storage frame 204 and/or counterweight elements frame 205. In the shown embodiments these temporary supports comprise a number of, here four, hydraulic jacks 208a each placed on or integrated with a removable support 208b. In an alternative temporary supports can be integrated with the motion bases, e.g. embodied as hydraulic extendable legs of the motion base.

The well 60 may contain a staircase, e.g. a spiralling staircase, e.g. to the bottom of the well 60. One can also envisage the provision of a lift, e.g. with a vertical guide rail, in the well to allow access of personnel to the bottom of the well. If desired one or more landings may be provided at different heights within the well 60.

The well 60 can comprise a bottom 61 provided with one or more premade drilling holes, e.g. the bottom made of reinforced concrete or steel. In the FIG. 9 four holes are shown. The premade holes allow for drilling holes 206 into the soil below the bottom of the well, e.g. several hundreds of meters deep. Such drilling holes 206 can be drilled and can subsequently be filled to permit repeated drilling.

The bottom 61 of the well 60 may comprise attachment means 207, e.g. a hook or eye plate, to which an object, e.g. a cable can be attached, in order to perform tests on or involving the hoisting device of the drilling tower 10. For example the well 60 can be used for subjecting an object to a tensile test, with the object being secured between the attachment means 207 and the hoisting device, and the hoisting device being operated to place the object under a tensile load. As discussed the well may also be flooded, so that such testing can be done underwater, e.g. to test underwater behaviour of an object whilst subjected to tensile load.

Figure 11:
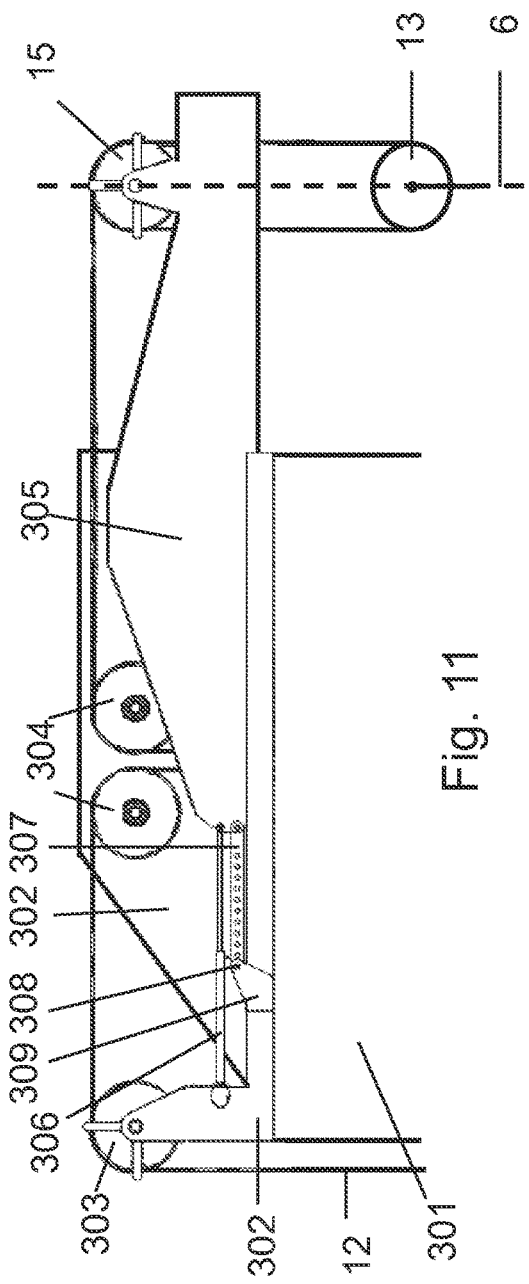
FIG. 11 shows in a side view another embodiment of the top of the drilling tower according to the invention, wherein an extendable top frame of said top of the drilling tower is extended.
Figure 12:
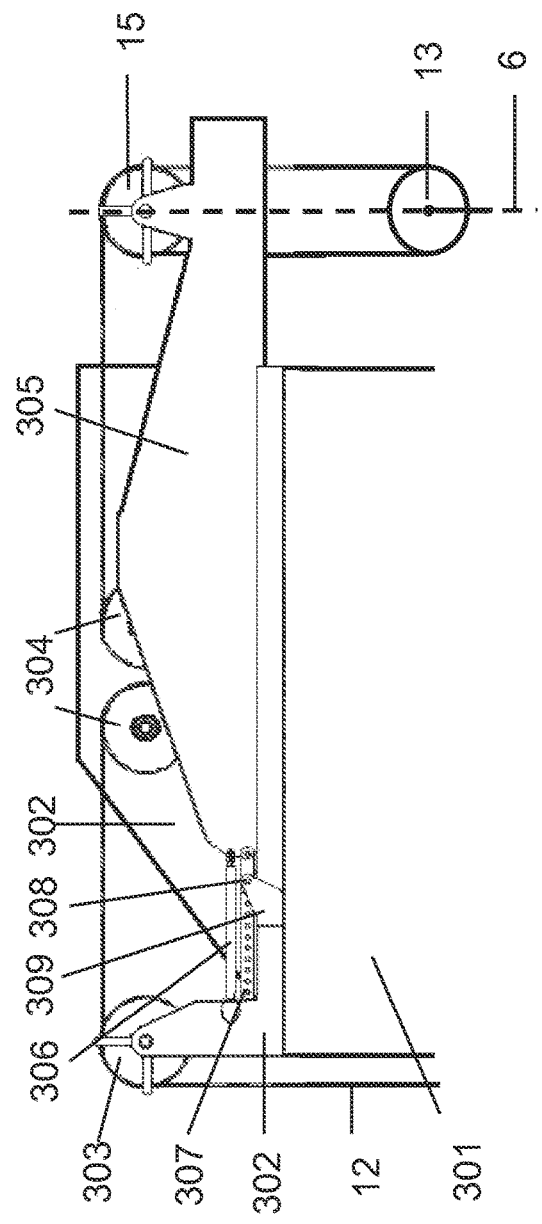
FIG. 12 shows the top of the drilling tower of FIG. 11 with said top frame in a retracted state.

The drilling tower 10 may comprise a laterally extendable top section. With reference to FIGS. 11 and 12 this embodiment of the drilling tower 10 will be discussed.

The drilling tower 10 comprises a mast 301 erected on the motion base 5. The drilling tower 10 further comprises one or more hoisting winches 11, e.g. attached to the motion base 5, and one or more hoisting cables 12 driven by the one or more winches 11.

The drilling tower 10 further comprises a fixed top frame or top member 302 rigidly attached to the top of said mast, said fixed frame or member 302 comprising one or more rear pulleys 303 to guide said one or more cables 12 from said one or more winches over the top of the drilling tower 11. The fixed frame 302 further comprises heave compensator path pulleys 304 to guide said cable 12 to and from a heave compensator cylinder (not shown), here provided in the interior of the mast 301.

The drilling tower 10 further comprises a movable or extendable top frame 305. This movable top frame 305 is movable with respect to the fixed top frame 302 towards and away from the mast 301 along a direction substantially parallel to the pivot axis of the test drilling rig 4 in order to be able to vary the location of the firing line relative to the structure of the tower.

The drilling tower 10 here further comprises at least one hydraulic cylinder 306 attached at one end to the fixed top frame 302 and attached to the movable top frame 305 at the other end, said hydraulic cylinder 306 being adapted to move the movable top frame 305 with respect to the fixed top frame 302. The interface between fixed frame 302 and movable frame 305 may for instance be embodied as a skidding arrangement or comprise a rail on top of the fixed frame 302 and wheels underneath the movable frame 305 to move the movable frame.

The drilling tower further comprises a locking mechanism to maintain the position of the movable top frame 305 with respect to the fixed top frame. Said locking mechanism here comprises a locking beam 307 rigidly attached to the movable frame part, a locking pin 308 to be placed through holes in the locking beam 307, and a lock pin holder 309 rigidly attached to the fixed top frame 302 to maintain the pin 308 and thereby the locking beam 307 and the full movable top frame section 305 in position.

The drilling tower further comprises one or more crown blocks 15 and one or more travelling pulley blocks 13 along which cable or cables 12 pass to raise and lower the travelling pulley blocks 13. For example a topdrive can be suspended from the block or blocks 13.

The one or more crown blocks 15 are secured to the movable top frame 305, here at the end of the movable top frame 305 approximately above the well 60 to guide the cable 12.

The extension and retraction of the top section of the drilling tower as described above moves the crown block 15 and travelling block 13 further away or closer to the mast 301, for example by between 1 and 5 m, e.g. allowing for adjustment over a range of at least 1 meter, e.g. at least 2 m. As the firing line 6 runs in the vertical direction through the center of the travelling block 13 the position of the firing line 6 is in this way adjusted.

What is claimed is:

1. A land based dynamic sea motion simulating test drilling rig comprising:
   a foundation bound to a soil,
   a pivot structure secured to said foundation, said pivot structure providing at least one horizontal pivot axis,
   a motion base mounted on said pivot structure,
   a drilling tower erected on said motion base and having a foot that is secured to said motion base, the drilling tower being provided with a hoisting device adapted to manipulate a drill string section in a vertical firing line,
   a drilling tubulars storage adapted for vertical storage of one or more drilling tubulars, said tubulars storage secured to said motion base,
   a tubulars racker device arranged and configured to move drilling tubulars between the drilling tubulars storage and the firing line allowing for assembly and disassembly of a drill string section in the firing line, and
   a motion drive bound to said soil,
   wherein the drilling tower, the drilling tubulars storage, and the tubulars racker device form an assembly, and
   wherein in order to simulate said assembly being subject to motion as if induced by sea state, the motion base is pivotable about said at least one horizontal pivot axis relative to the foundation, and the motion drive is adapted to impart cyclic pivoting motion about said at least one horizontal pivot axis to said assembly as a whole.

2. The rig of claim 1, further comprising a well sunken into said soil and aligned with the firing line.

3. The rig of claim 1, wherein said motion drive is adapted to impart a cyclic pivoting motion having a period in a range between 2 and 30 seconds.

4. The rig according to claim 1, wherein said motion drive is adapted to impart a cyclic pivoting motion having a pivot angle relative to vertical of at least +/−1°.

5. The rig according to claim 1, wherein the pivot structure provides a single horizontal pivot axis.

6. The rig according to claim 1, wherein the motion drive comprises a strut having an upper end attached to the drilling tower at an elevated position thereof and having a lower end attached to a drive motor device.

7. The rig according to claim 1, wherein the motion drive is a pendulum system comprising:
   a frame secured to a pendulum foundation bound to said soil,
   a compound pendulum suspended from said frame, the compound pendulum swingable relative to the frame about at least one horizontal swing axis,
   a strut having an end pivotally attached to the drilling tower at an elevated position thereof, and having another end pivotally connected to the compound pendulum by means of a pivot connector providing a pivot point that is offset from said at least one swing axis between the compound pendulum and frame, and
   a drive motor,
   wherein the drive motor is adapted to supply energy to impart a cyclic motion to the assembly of compound pendulum, strut, motion base, drilling tower, drilling tubulars storage and tubulars racker device.

8. The rig according to claim 7, wherein the pendulum system further comprises one or more weight elements that can be added to and removed from the compound pendulum to adjust the resonance frequency and/or acceleration of the assembly of compound pendulum, strut, motion base, drilling tower, drilling tubulars storage and tubulars racker device.

9. The rig according to claim 1, wherein the rig further comprises one or more counterweight elements that can be added to one or more of the motion base, drilling tower, drilling tubulars storage, and tubulars racker device in order to balance the assembly of motion base, drilling tower, drilling tubulars storage and tubulars racker device, relative to the horizontal pivot axis.

10. The rig according to claim 7, wherein the at least one horizontal pivot axis of the test drilling rig pivot structure is a single horizontal pivot axis, and wherein the compound pendulum is swingable about one horizontal swing axis.

11. The rig according to claim 7, wherein the pendulum system further comprises a locking device that is adapted to lock the compound pendulum to the frame to prevent said cyclic motion of the assembly of compound pendulum, strut, motion base, drilling tower, drilling tubulars storage and tubulars racker device.

12. The rig according to claim 7, wherein the pendulum system further comprises load measurement device adapted to determine the load imparted on the compound pendulum by an imbalance of the assembly of motion base, drilling tower, drilling tubulars storage and tubulars racker.

13. The rig according to claim 7, wherein the frame comprises a plurality of frame parts adjustable relative to each other in order to adjust the position of the pivot connector that connects the strut and the compound pendulum and thereby allowing to impart to the motion base a stationary non-zero pivot angle relative to horizontal.

14. The rig according to claim 13, wherein the stationary non-zero pivot angle relative to horizontal is between 0.1° and 10°.

15. The rig according to claim 7, wherein the pendulum system further comprises a braking device adapted to bring the assembly of compound pendulum, strut, motion base, drilling tower, drilling tubulars storage and tubulars racker device to a hold.

16. The rig according to claim 1, wherein the drilling tower comprises one or more vertical rails and a trolley vertically guided by said one or more rails, said trolley carrying and/or being adapted to carry a rotary topdrive device adapted to impart rotary drive to a drill string section.

17. The rig according to claim 1, wherein the tower has a tower structure and the firing line is outside of and alongside a side of the tower structure.

18. The rig according to claim 1, wherein the top of the tower comprises an extendable frame that can be extended and retracted in a lateral direction to allow the position of the firing line to be adjusted.

19. The rig according to claim 1, wherein the tubular storage device is a vertical axis carousel adapted for storage of drilling tubulars in vertical orientation therein.

20. The rig according to claim 2, wherein the rig comprises a drill floor and a tubulars string slip device, which slip device is adapted to support the weight of a tubulars string suspended therefrom along the firing line in the well.

21. The rig according to claim 5, wherein the motion base comprises two beams parallel to each other and spaced apart, said beams parallel to the pivot axis of said motion base, said beams extending from the drilling tower towards the firing line and configured to place and hold one or more tools in the firing line.

22. The rig according to claim 1, wherein the rig comprises a tower structure with the firing line outside of and alongside a side of the tower structure, and wherein the rig comprises two tubulars storage devices for vertical storage of drilling tubulars, said two tubulars storage structure being arranged at opposite sides of the tower structure different from the firing line side, and wherein the rig comprises two tubulars racker devices each associated with one of the two storage devices, and each being configured to move drilling tubulars between the associated storage device and the firing line, wherein the two storage devices are positioned at opposite sides of a drill floor.

23. The rig according to claim 1, wherein the rig comprises a tower structure with the firing line outside of and alongside a side of the tower structure, and wherein the rig comprises one storage device for vertical storage of drilling tubulars, said tubulars storage device being arranged at one side of the tower structure different from the firing line side, and wherein the rig comprises one tubulars racker device configured to move drilling tubulars between the storage device and the firing line, and wherein the rig comprises a counterweight elements frame to hold counterweight elements, wherein the tubulars storage structure and counterweight elements frame are positioned at opposite sides of a drill floor.

24. The rig according to claim 1, wherein the rig comprises an operator's cabin that is stationary mounted on the foundation.

25. A method for performing a test wherein use is made of a land based dynamic sea motion simulating test drilling rig comprising:
 a soil bound foundation,
 a pivot structure secured to said foundation, said pivot structure providing at least one horizontal pivot axis,
 a motion base mounted on said pivot structure,
 a drilling tower erected on said motion base and having a foot that is secured to said motion base, the drilling tower being provided with a hoisting device adapted to manipulate a drill string section in a vertical firing line,
 a drilling tubulars storage adapted for vertical storage of one or more drilling tubulars, said tubulars storage secured to said motion base,
 a tubulars racker device arranged and configured to move drilling tubulars between the drilling tubulars storage and the firing line allowing for assembly and disassembly of a drill string section in the firing line, and
 a motion drive,
 wherein the drilling tower, drilling tubulars storage, and tubulars racker device form an assembly, and
 wherein in order to simulate said assembly being subject to motion as if induced by sea state, the motion base is pivotable about said at least one horizontal pivot axis relative to the foundation, the motion drive is adapted to impart cyclic pivoting motion about said at least one horizontal pivot axis to said assembly as a whole,
 the method comprising a cyclic pivoting motion being imparted by said motion drive about the at least one, or only one, horizontal pivot axis to the assembly of the drilling tower, drilling tubulars storage, and tubulars racker device.

26. The method of claim 25, wherein a well is present that is sunken into the soil and aligned with the firing line, and wherein the method comprises, whilst said motion drive imparts said cyclic pivoting motion, the lowering of a drill string section by said hoisting device into said well.

27. The method of claim 25, wherein said motion drive imparts a cyclic pivoting motion having a period in a range between 2 and 30 seconds.

28. The method of claim 25, wherein said motion drive imparts a cyclic pivoting motion having a pivot angle relative to vertical of at least +/−1° and at most +/−10°.

29. The method of claim 25, wherein method comprises, whilst said motion drive imparts said cyclic pivoting motion, the transfer of drilling tubular stands by said tubulars racker device between the tubulars storage and a position aligned with the firing line.

30. The method of claim 25, wherein the method comprises, whilst said motion drive imparts said cyclic pivoting motion, the making up and/or breaking up of a tubulars string in the firing line.

31. A land based dynamic sea motion simulating test rig comprising:
 a foundation,
 a pivot structure secured to said foundation, said pivot structure providing at least one horizontal pivot axis,
 a motion base mounted on said pivot structure,
 a tower erected on said motion base,
 a tubulars racker device, and
 a soil based motion drive,
 wherein the tower and the tubulars racking device form an assembly, and
 wherein in order to simulate said tower and tubulars racker device being subject to said motion as if induced by sea state, the motion base is pivotable about said at least one horizontal pivot axis relative to the foundation, and the motion drive is adapted to impart cyclic pivoting motion about said at least one horizontal pivot axis to the assembly as a whole.

32. The rig of claim 31, wherein the tower and the tubulars racker device are adapted to handle drilling tubular stands having a length greater than 90 feet.

33. The rig of claim 31, wherein the tower comprises one or more vertical rails and a trolley that is vertically guided by said one or more vertical rails, said trolley carrying a rotary topdrive device adapted to impart rotary drive to a drill string section in the firing line.

34. The rig of claim 31, wherein the motion base is provided with a drill floor having a well center therein through which the firing line passes.

35. A land based dynamic sea motion simulating test rig for use in testing of a tubulars racker device, said rig comprising:
 a tower,
 a tubulars racker device connected to said tower, and
 a soil based motion drive,
 wherein the tower and tubulars racker device form an assembly, and
 wherein in order to simulate said assembly being subject to said motion as if induced by sea state, the tower is pivotal about at least one horizontal tower pivot axis, and the motion drive is adapted to impart cyclic pivoting motion about said at least one horizontal tower pivot axis to said assembly as a whole.

36. The rig of claim 35, wherein the tower and the tubulars racker device are adapted to handle drilling tubular stands having a length greater than 90 feet.

37. The rig of claim 35, wherein said motion drive is adapted to impart a cyclic pivoting motion having a period in a range between 2 and 30 seconds.

38. The rig of claim 35, wherein the motion drive is adapted to impart a variable pivot angle in a range between +1-1° and +1-10°.

39. The rig of claim 35, wherein the tubulars racker device comprises:
 a vertical rails mounted on said tower,
 one or more motion arm assemblies mounted on said vertical rails,
 wherein each motion arm assembly comprises a base that is vertically mobile along said vertical rails by a vertical drive including a motor, and a motion arm connected to said base, the motion arm of at least one arm assembly being provided with a tubular gripper member connected to said arm.

40. The rig of claim 35, wherein the tower comprises one or more vertical rails and a trolley that is vertically guided by said one or more vertical rails, said trolley carrying a rotary topdrive device adapted to impart rotary drive to a drill string section in the firing line.

41. The rig of claim 35, wherein the tower is provided with a drill floor having a well center therein through which the firing line passes.

42. A land based dynamic sea motion simulating test drilling rig, said rig comprising:
 a drilling tower comprising one or more vertical rails,
 a trolley vertically guided by said one or more rails,
 a rotary topdrive device carried by said trolley and adapted to impart rotary drive to a drill string section,
 a drill floor on said motion base, said drill floor having a well center,
 a tubulars string slip device arranged at said well center, and
 a motion drive
 wherein in order to simulate said assembly being subject to said motion as if induced by sea state, the drilling tower is erected on a motion base that is pivotal about at least one horizontal pivot axis, and the motion drive is adapted to impart cyclic pivoting motion about said at least one horizontal pivot axis to the assembly of the drilling tower, trolley, rotary topdrive device, drill floor, and tubulars string slip device.

* * * * *